Jan. 31, 1961

O. A. SHAW, JR 2,969,953

ELECTRICAL FISH TAPE WINDER

Filed Feb. 20, 1958

INVENTOR.
ORSON A. SHAW JR.
BY
Andrew F. Wintercorn
ATTORNEY

United States Patent Office 2,969,953

Patented Jan. 31, 1961

2,969,953

ELECTRICAL FISH TAPE WINDER

Orson A. Shaw, Jr., Belvidere, Ill., assignor, by mesne assignments, to Holub Industries, Inc., Sycamore, Ill., a corporation of Illinois Filed Feb. 20, 1958, Ser. No. 716,422

3 Claims. (Cl. 254—134.3)

This invention relates to a fish tape winder for use by electricians as a reel for paying out and winding up a steel fishing tape used in pulling wires through conduits.

The principal object of my invention is to further improve reels of the type first disclosed in Hormel Patent No. 1,890,945, issued December 13, 1932, with a view to reducing the amount of effort expended in the operation thereof and maintaining better control of the tape, so that there is less likelihood of getting the tape twisted, kinked or bent. It is particularly important in the operation of such reels to maintain complete control of the tape, which, being of tempered steel, exerts considerable pressure in the direction of uncoiling and straightening itself out, so that unless there is always a positive hold on the tape the danger arises of the tape springing out accidentally and catching on things in the vicinity, and, bearing in mind that these reels are frequently used in the vicinity of switchboards and other current carriers, electrical shorts and damage to equipment becomes a possibility, and even electrocution.

In the reel of my invention, a transversely slotted guide member providing rounded guide surfaces on the opposite sides thereof is slidable circumferentially of the periphery of the hollow circular spring metal case with the tape extending through the slot thereof to slide on one of the two rounded guide surfaces as the guide is moved in one direction for paying out tape and slide on the other rounded guide surface as the guide is moved in the opposite direction for winding up the tape, the case being slidably supported in the operator's one hand that is used for sliding the guide member and being turned relative to the guide member with the other hand, so that the operator always keeps the tape under complete control. The guide member is preferably slidably mounted between the rounded sides of the circumferentially extending slot in the periphery of the case, which is normally narrower than the width of the tape, so that as the tape is withdrawn the rounded sides of the circumferential slot frictionally and resiliently engaging the lateral edges of the tape give a fairly uniform friction drag, and there is, therefore, no likelihood of accidental unwinding of tape despite its resilience and inherent tendency to spring outwardly to a straightened condition.

The invention is illustrated in the accompanying drawing, in which—

Fig. 1 is a side view of a fish tape winder made in accordance with my invention and shown on a reduced scale, the operator's two hands being indicated at two points to illustrate the mode of operation;

Figs. 2 and 3 are side elevations of a portion of the device of Fig. 1 shown about half-size, Fig. 2 showing the relationship of the tape to the slidable guide in paying out tape, whereas Fig. 3 illustrates the winding up operation in which the slidable guide is moved in the opposite direction;

The same reference numerals are applied to corresponding parts throughout the views.

Figures 1, 2:
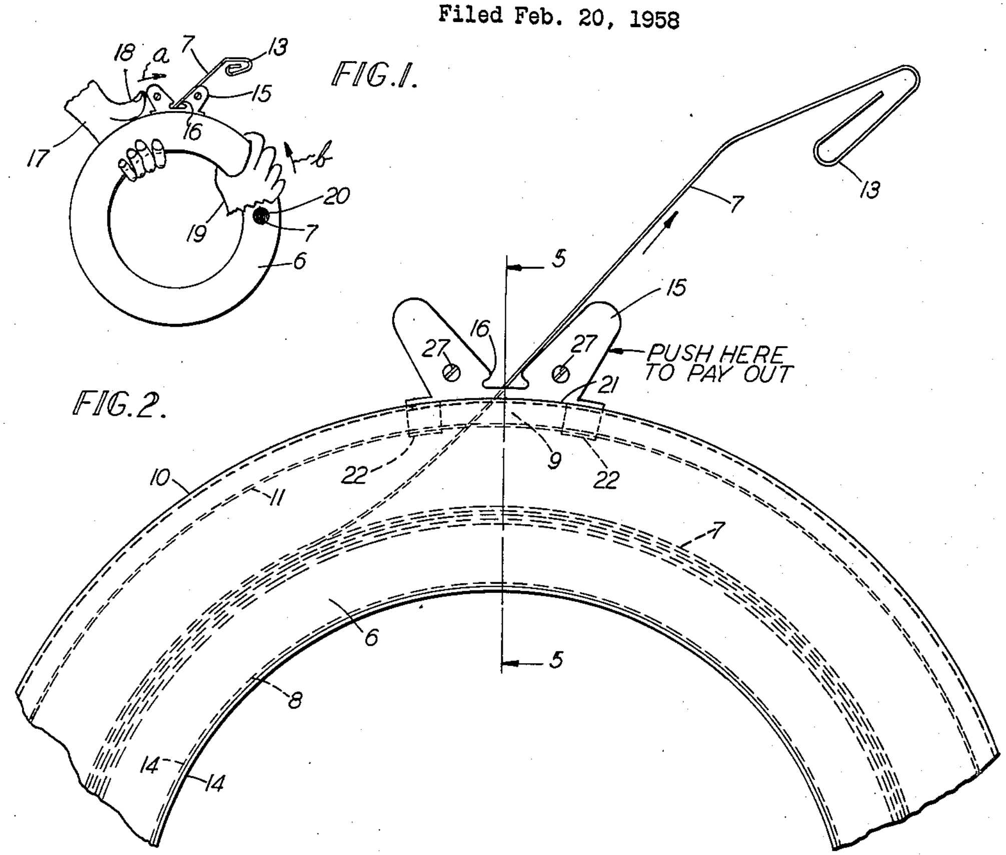

Referring to the drawing, the reference numeral 6 designates the hollow, circular, spring metal reel-case constructed along the lines of that disclosed in the Hormel Patent 1,890,945, the same being of annular, hollow, channel form and arranged to have the coil of steel fish tape 7 wound therein around its radially inner wall 8 and extend out through the circumferentially extending slot 9, that is defined in the middle of the radially outer wall 10 between the inwardly curled edge portions 11. The width of the slot 9 is normally narrower than the width of the tape 7, so that as the tape is withdrawn the rounded sides of the slot 9 snugly and firmly frictionally engage the lateral edges of the tape, and, due to the fact that the case 6 is of spring sheet steel construction having spring-like resiliency, the pressure on the tape 7 is resilient and there is, therefore, fairly uniform friction drag exerted. A suitable clip projection 12 is provided on the radially inner wall 8 for connection of a hooked inner end of the tape, and a hook 13 is formed on the outer end of the tape for connection with the wire to be pulled through the conduit. The case 6 is of two-piece construction, the inner annular flanges 14 on the two pieces having a telescoping fit and being spot welded together at circumferentially spaced intervals.

Figure 3:
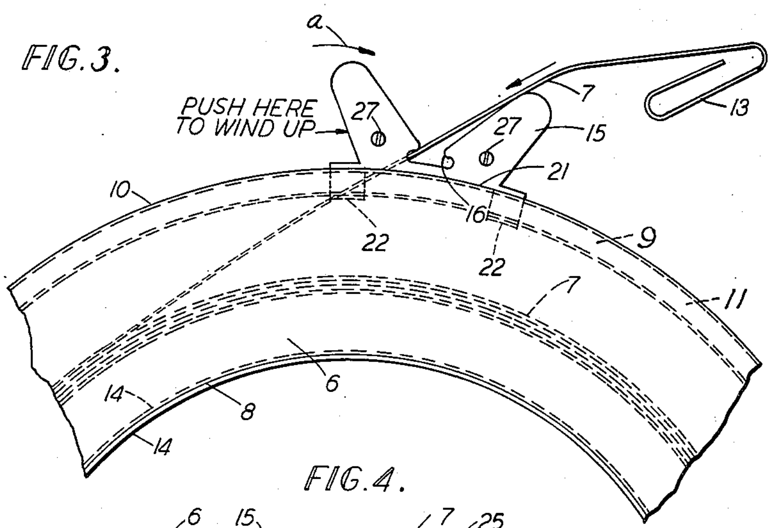
Figure 5:
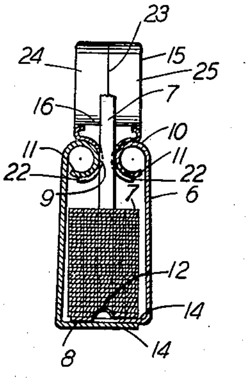
Fig. 5 is a cross-section on the line 5—5 of Fig. 2.
Figure 4:
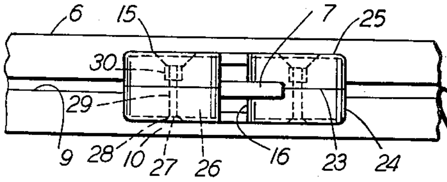
Fig. 4 is a plan view of a portion of the device showing the V-shaped guide and its relationship to the tape and the circumferentially extending slot.

In accordance with my invention, a generally V-shaped guide member 15 is slidable circumferentially of the periphery of the case 6 with the apex of the V toward said periphery, where a transversely extending slot 16 is provided defining the spaced parallel rounded surfaces extending transversly relative to the slot 9 in the case, and with the tape 7 extending through said slot 9 to slide on the surface on one side of the guide as it is moved in one direction for paying out the tape, as shown in Fig. 2, and on the surface on the other side of the guide as it is moved in the opposite direction for winding up the tape, as shown in Fig. 3. The case is slidably supported in the one hand, as indicated at 17 in Fg. 1, that slides the guide 15 by engagement of the thumb 18 against the back of the guide, while the case is being turned relative to the guide with the other hand indicated at 19, so that the operator always has the tape under control. The operation illustrated in Fig. 1 is that of winding up the tape, as in Fig. 3, the guide 15 being slid forward in the direction of the arrow *a* by thumb pressure of hand 17 while the case 6 is simultaneously being turned by hand 19 in a counterclockwise direction, as indicated by arrow *b*. Referring again to Fig. 1, if the thumb of the one hand 17 is used to pull the guide in a counterclockwise direction while the other hand 19 turns the reel in a clockwise direction, the tape 7 is payed out, as in Fig. 2, without reversing the relationship of the hands to the reel 6.

The V-shaped guide member 15 has an arcuate bottom surface 21 struck on approximately the same radius as the periphery 10 of the case 6 to slide smoothly thereon, and there are provided at both ends, on the bottom portion of the guide, oppositely curved pairs of bearing lugs 22, which are struck on arcs approximately equal to the radius of curvature of the curled edge portions 11 on opposite sides of the circumferential slot 9, the lugs 22 having an easy sliding fit on these curled edge portions. The body of the guide 15 is herein shown as split longitudinally on the center line 23 and formed of two pieces of stamped sheet metal 24 and 25 with blocks 26 inserted in the hollows thereof and screws 27 entered in holes 28 in the piece 24 through holes 29 in the blocks 26 and threaded in necks 30 provided on the piece 25. This construction enables assembly of the guide 15 on a reel inasmuch as it permits entering the lugs 22 of each piece 24 and 25 in slot 9 and thereafter entering blocks 26 in the hollows thereof and then inserting screws 27 and tightening the same to complete the assembly. The present invention is therefore applicable to existing reels and is not limited to selling as a part of a complete unit.

In operation, the guide member 15 with the tape 7 extending through the transverse slot 16 in the apex portion of the V maintains positive control of the tape at all times so that there is no likelihood of its getting twisted, kinked or bent, and never any possibility of the tape accidentally springing loose from the case and getting hooked onto adjacent objects, with possible resulting damage in the case of current carrying devices, or even electrocution of the operator. Whereas some other fish tape winders have been rather awkward to operate with two hands, the present device is operable easily by slidably guiding the case in one hand 17 while pushing the guide 15 forward with the thumb 18 and turning the case relative to it with the other hand 19, as shown in Fig. 1. This operation corresponds with what is shown in Fig. 3. The tape slides on a rounded surface at 16 on one side of the guide 15 as it is moved in one direction during winding up of the tape, as appears in Fig. 3, but slides on the other rounded surface at 16 on the other side of the guide as it is moved in the opposite direction in the paying out operation, as seen in Fig. 2. There is substantially the same frictional drag on the movement of the tape in winding it up as there is in paying it out, inasmuch as the frictional drag imposed by the case itself on the lateral edges of the tape 7 at opposite sides of the circumferential slot 9 always remains the same. The holes 20 provided in the opposite side walls of the case 6 serve as windows through which the operator can check now and then during use of the device to see how much tape is left in reserve when any considerable length has been payed out. There are no rollers or wheels and no moving parts of any kind apt to require any attention or need replacement or repair, and there is never any need for the operator taking hold of the tape to wind it or unwind it, and that is a big advantage because the tape is usually coated fairly liberally with graphite to facilitate sliding thereof in the conduit and also facilitate movement relative to the case in winding and unwinding.

It is believed the foregoing description conveys a good understanding of the objects and advantages of my invention. The appended claims have been drawn to cover all legitimate modifications and adaptations.

I claim:

1. In combination with an electrician's fish tape reel having an outer peripheral wall including opposed, circumferentially extending, resilient, rounded edge portions normally disposed in uniformly spaced relation to define an annular slot of uniform width through which a fish tape of a slightly greater uniform width is movable endwise by spreading said rounded edge portions for a friction drag effect on the tape in its winding on or unwinding from the reel, a tape guide member disposed on and conformed on its radially inner side to the periphery of said reel and having opposite end portions on which are provided bearings disposed between and conformed to and slidably engaging said rounded edge portions, said guide member having the middle portion thereof between said bearings open to define two spaced parallel rounded guide surfaces extending transversely relative to said slot for extension of said tape from said reel between said guide surfaces and bearings, said tape slidably engaging one of said guide surfaces in winding onto the reel and the other of said guide surfaces in unwinding from the reel.

2. The structure set forth in claim 1, including outward extensions on opposite ends of said guide member in the plane of the reel for manual engagement in the movement of said guide member peripherally of the reel, one of said extensions having an elongated bearing surface provided thereon for slidable engagement by the tape extending from one of said guide surfaces and inclined in the general direction of the tape extending from the reel.

3. An electrician's fish tape reel having an outer peripheral wall including opposed, circumferentially extending, resilient, rounded edge portions normally disposed in uniformly spaced relation to define an annular slot of uniform width through which a fish tape of a slightly greater uniform width is movable endwise by spreading said rounded edge portions for a friction drag effect on the tape in its winding on or unwinding from the reel, and a tape guide member carried on the outside of said reel and slidable circumferentially with respect to the periphery thereof and having an opening provided therein defining two spaced parallel rounded guide surfaces extending transversely relative to said slot for extension of said tape from said reel between said guide surfaces, said tape slidably engaging one of said guide surfaces in winding onto the reel and the other of said guide surfaces in unwinding from the reel, there being outward extensions on opposite ends of said guide member in the plane of the reel for manual engagement in the movement of said guide member peripherally of the reel, one of said extensions having an elongated bearing surface provided thereon for slidable engagement by the tape extending from one of said guide surfaces and inclined in the general direction of the tape extending from the reel.

References Cited in the file of this patent

UNITED STATES PATENTS

| | | |
|---|---|---|
| 1,069,593 | Weaver et al. | Aug. 5, 1913 |
| 1,096,963 | Sweeney | May 9, 1914 |
| 1,811,945 | Lange | June 30, 1931 |
| 1,890,945 | Hormel | Dec. 13, 1932 |
| 2,173,352 | Carson | Sept. 19, 1939 |
| 2,689,709 | Waldschmidt | Sept. 21, 1954 |
| 2,743,884 | Briggs | May 1, 1956 |